US011220255B2

(12) United States Patent
Crawford et al.

(10) Patent No.: US 11,220,255 B2
(45) Date of Patent: Jan. 11, 2022

(54) SYSTEMS AND METHODS FOR MITIGATING TRAILER INSTABILITY DUE TO PRESSURE DIFFERENTIALS

(71) Applicant: Toyota Motor Engineering & Manufacturing North America, Inc., Plano, TX (US)

(72) Inventors: Robert J. Crawford, Pinckney, MI (US); Paxton S. Williams, Milan, MI (US); Nicholas S. Sitarski, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 333 days.

(21) Appl. No.: 16/261,841

(22) Filed: Jan. 30, 2019

(65) Prior Publication Data

US 2020/0238976 A1    Jul. 30, 2020

(51) Int. Cl.
*B60W 30/02* (2012.01)
*B60W 10/20* (2006.01)
*B60W 10/10* (2012.01)
*B60W 10/04* (2006.01)
*B60W 10/18* (2012.01)

(52) U.S. Cl.
CPC .......... *B60W 30/02* (2013.01); *B60W 10/04* (2013.01); *B60W 10/10* (2013.01); *B60W 10/18* (2013.01); *B60W 10/20* (2013.01)

(58) Field of Classification Search
None
See application file for complete search history.

(56) References Cited

U.S. PATENT DOCUMENTS

| 5,747,683 | A  | * | 5/1998  | Gerum .................. | B60T 8/1708 |
| | | | | | 701/72 |
| 8,244,442 | B2 | * | 8/2012  | Craig .................... | B60T 8/1755 |
| | | | | | 701/70 |
| 8,326,504 | B2 | * | 12/2012 | Wu ......................... | B60D 1/30 |
| | | | | | 701/69 |
| 9,008,369 | B2 |   | 4/2015  | Schofield et al. | |
| 9,061,663 | B2 | * | 6/2015  | Wu ........................ | B60T 8/1708 |
| 9,139,240 | B1 | * | 9/2015  | Long ...................... | G07C 5/008 |
| 2007/0257549 | A1 | * | 11/2007 | Tandy, Jr. ............... | B60T 8/245 |
| | | | | | 303/7 |

(Continued)

FOREIGN PATENT DOCUMENTS

WO    WO-2005015260 A1  *  2/2005  ........... G01S 15/931

*Primary Examiner* — James J Lee
*Assistant Examiner* — Wenyuan Yang
(74) *Attorney, Agent, or Firm* — Christopher G. Darrow; Darrow Mustafa PC

(57) ABSTRACT

System, methods, and other embodiments described herein relate to improving stability of a trailer being towed by a vehicle. In one embodiment, a method includes analyzing sensor data from a set of sensors associated with the vehicle to generate a pressure signature that characterizes lateral forces on the trailer resulting from a pressure differential between opposite sides of the trailer. The method includes, in response to determining the pressure signature satisfies criteria indicating an onset of instability in the trailer, generating a control signal based, at least in part, on the pressure signature that activates one or more vehicle systems to mitigate the instability in the trailer.

20 Claims, 7 Drawing Sheets

(56) References Cited

U.S. PATENT DOCUMENTS

| | | | |
|---|---|---|---|
| 2007/0260385 A1* | 11/2007 | Tandy, Jr. | B60T 8/246 |
| | | | 701/70 |
| 2007/0260386 A1* | 11/2007 | Tandy, Jr. | B60T 8/1755 |
| | | | 701/70 |
| 2008/0255741 A1 | 10/2008 | Traechtler | |
| 2009/0093928 A1* | 4/2009 | Getman | B60T 8/1708 |
| | | | 701/37 |
| 2011/0257860 A1* | 10/2011 | Getman | G01S 13/931 |
| | | | 701/70 |
| 2015/0057907 A1 | 2/2015 | Rebhan | |
| 2015/0165850 A1* | 6/2015 | Chiu | B60D 1/62 |
| | | | 701/41 |
| 2017/0334444 A1* | 11/2017 | Hawes | G08G 1/09626 |
| 2018/0093538 A1* | 4/2018 | Rothschild | B60D 1/30 |
| 2020/0160054 A1* | 5/2020 | Rogan | G06K 9/00214 |

* cited by examiner

SYSTEMS AND METHODS FOR MITIGATING TRAILER INSTABILITY DUE TO PRESSURE DIFFERENTIALS

TECHNICAL FIELD

The subject matter described herein relates, in general, to mitigating instability in a trailer being towed by a vehicle, and, more particularly, to monitoring pressure differentials on a trailer/vehicle to detect an onset of the instability and automatically control the vehicle/trailer to mitigate the instability.

BACKGROUND

Towing a trailer with a vehicle such as a pickup truck presents unique operating considerations for a driver that are generally not present when operating a vehicle without a trailer. For example, towing a trailer can change operating characteristics of the vehicle such as stopping distance, maneuverability, and so on. Additionally, environmental characteristics such as crosswind, pressure fronts from other vehicles, and other such occurrences can have a greater effect on stability of the trailer-vehicle pair than a vehicle being driven without a trailer. In other words, because of dynamics that exist between the trailer and the vehicle due to, for example, an attachment mechanism between the trailer and the vehicle, an extension in overall length/wheelbase due to the addition of the trailer, and other such considerations, the trailer-vehicle combination can experience various effects such as sway that are not generally present otherwise.

Consequently, towing-related accidents can result when a driver is inexperienced with controlling the vehicle-trailer to mitigate such issues or is otherwise incapable of preventing the instability due to poor reaction time, a severity of forces inducing the instability, and so on. As such, operating a vehicle that is towing a trailer presents unique safety considerations in relation to ensuring the stability of the trailer under various operating conditions.

SUMMARY

Example systems and methods disclosed herein relate to mitigating instability in a trailer being towed by a vehicle. As previously noted, instability in a trailer being towed by a vehicle may result in accidents from the vehicle-trailer becoming difficult to control or even becoming uncontrollable due to, for example, oscillations from trailer sway. In particular, trailer sway can occur from lateral forces on the trailer that originate from differences in pressure on opposing sides of the trailer. Because manually detecting and preventing such occurrences can be difficult for a driver, and, especially for a driver that lacks experience under such circumstances, manually controlling the vehicle-trailer combination when experiencing sway conditions represents a potentially dangerous circumstance.

Therefore, in one embodiment, a trailer stability system is disclosed that improves stability of the trailer and the vehicle. In one approach, the trailer stability system automatically detects the onset of sway and conditions that can induce the onset of sway in the trailer and mitigates the onset and any subsequent instability by controlling the vehicle/trailer to automatically counteract the sway. In particular, the trailer stability system uses sensors (e.g., pressure sensors, cameras, etc.) integrated with the vehicle and/or trailer to detect and/or predict pressure differentials on the trailer/vehicle such that the trailer stability system can identify the onset of instability in the trailer. From the determinations of the onset of the instability, the trailer stability system, in one approach, automatically generates controls (e.g., braking, accelerating, steering, etc.) that mitigate the instability. In this way, the trailer stability system improves control of the vehicle-trailer combination by using information from sensors of the vehicle/trailer to detect instability and act automatically to control the vehicle and/or trailer thereby preventing the development of sway.

In one embodiment, a trailer stability system for improving stability of a trailer being towed by a vehicle is disclosed. The trailer stability system includes one or more processors and a memory communicably coupled to the one or more processors. The memory stores a signature module including instructions that when executed by the one or more processors cause the one or more processors to analyze sensor data from a set of sensors associated with the vehicle to generate a pressure signature that characterizes lateral forces on the trailer resulting from a pressure differential between opposite sides of the trailer. The memory stores a stability module including instructions that when executed by the one or more processors cause the one or more processors to, in response to determining the pressure signature satisfies criteria indicating an onset of instability in the trailer, generate a control signal based, at least in part, on the pressure signature that activates one or more vehicle systems to mitigate the instability in the trailer.

In one embodiment, a non-transitory computer-readable medium for improving stability of a trailer being towed by a vehicle and including instructions that when executed by one or more processors cause the one or more processors to perform one or more functions is disclosed. The instructions include instructions to analyze sensor data from a set of sensors associated with the vehicle to generate a pressure signature that characterizes lateral forces on the trailer resulting from a pressure differential between opposite sides of the trailer. The instructions include instructions to, in response to determining the pressure signature satisfies criteria indicating an onset of instability in the trailer, generate a control signal based, at least in part, on the pressure signature that activates one or more vehicle systems to mitigate the instability in the trailer.

In one embodiment, a method for improving stability of a trailer being towed by a vehicle is disclosed. In one embodiment, the method includes analyzing sensor data from a set of sensors associated with the vehicle to generate a pressure signature that characterizes lateral forces on the trailer resulting from a pressure differential between opposite sides of the trailer. The method includes, in response to determining the pressure signature satisfies criteria indicating an onset of instability in the trailer, generating a control signal based, at least in part, on the pressure signature that activates one or more vehicle systems to mitigate the instability in the trailer.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 1 illustrates one embodiment of a vehicle within which systems and methods disclosed herein may be implemented.

DETAILED DESCRIPTION

Figure 1:
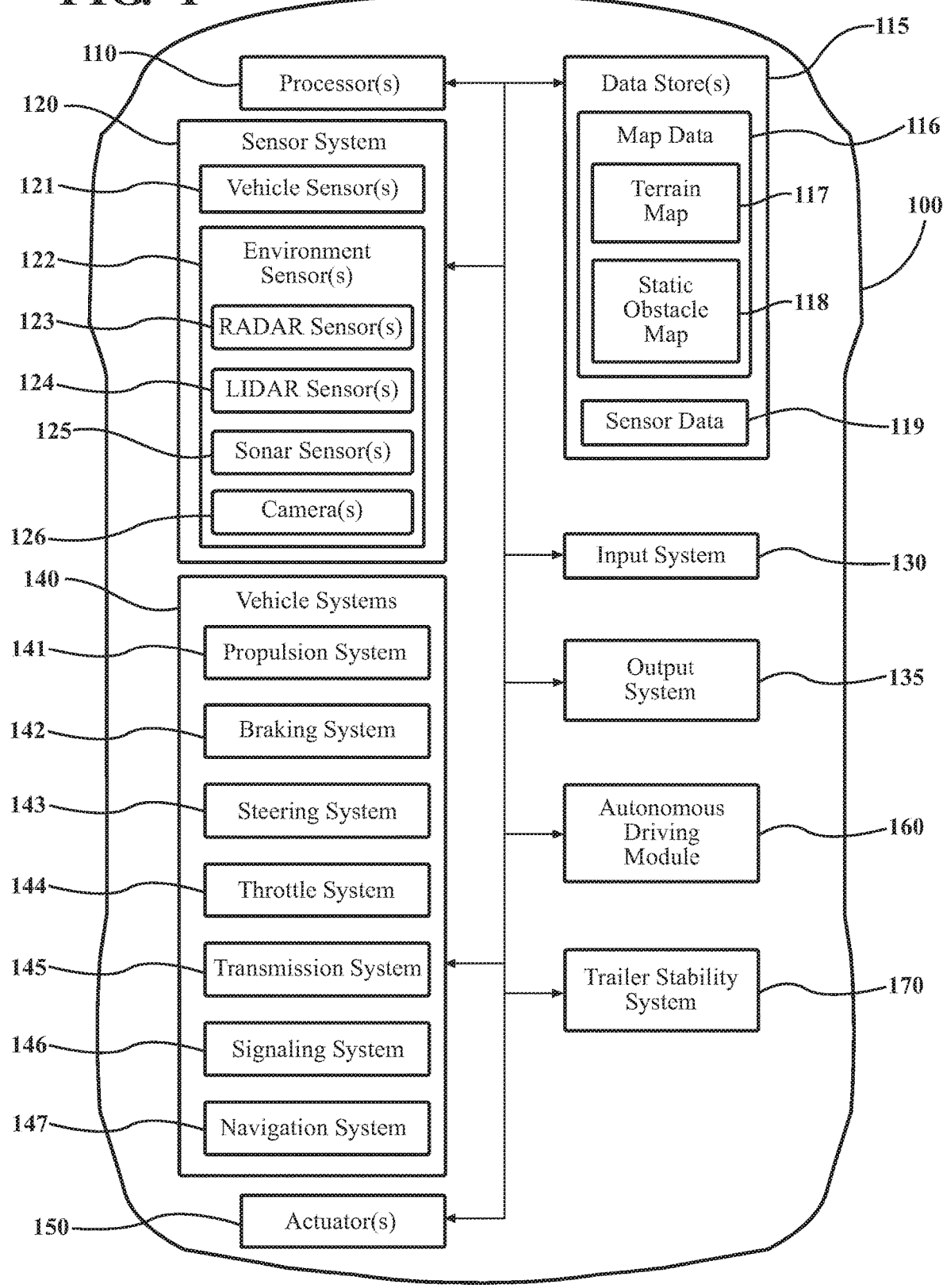

Systems, methods, and other embodiments associated with improving the stability of a trailer being towed by a vehicle in relation to occurrences of pressure differentials on the trailer are disclosed. As previously noted, instability in a trailer being towed by a vehicle may result in adverse occurrences such as accidents. That is, because the vehicle-trailer can become difficult to control when experiencing instability such as sway, such occurrences may cause the vehicle-trailer to tip, inadvertently cross lane boundaries, or to collide with other vehicles/obstacles.

Trailer sway can occur when lateral forces on the trailer, especially toward a rear section of the trailer, induce oscillating motion in a path of the trailer with respect to the vehicle. The lateral forces (i.e., perpendicular to a direction of travel) on the trailer result from differences in pressure on opposing sides of the trailer that may be induced by crosswinds, pressure fronts of passing vehicles (e.g., passing semi-trucks), and so on. For example, when another vehicle such as a semi-truck passes a vehicle towing a trailer and traveling in an opposite direction, a pressure front from the semi-truck impacts the side of the vehicle and the trailer. Because this is an unopposed force (i.e., there is no balancing force on the opposite side of the vehicle/trailer) a net resulting lateral force pushes against the vehicle and the trailer in a generally perpendicular direction to that of the direction of travel of the semi-truck. Thus, such occurrences from semi-trucks, buses, passenger vehicles, and/or natural events (e.g., crosswinds) can impart such forces on the trailer and the vehicle.

In general, the lateral forces push a rear of the trailer in one direction, which induces the front of the trailer to move in an opposing direction. Thus, as the vehicle moves forward the swaying motion of the trailer evolves into back and forth oscillations/sway of the trailer that opposes a straight-line path of the vehicle. The sway of the trailer exerts forces on the vehicle to which the trailer is attached thereby affecting vehicle motion and control. Moreover, because manually detecting and preventing occurrences of sway can be difficult for a driver, and, especially for a driver that lacks experience, the driver may not detect the sway in time to provide manual controls that counteract the sway and/or may not provide appropriate controls. As such, the vehicle and the trailer may experience sway conditions that result in an uncontrollable state and thus adverse outcomes.

Therefore, in one embodiment, a trailer stability system is disclosed that improves stability of the trailer and the vehicle by detecting the onset of trailer sway and automatically control the vehicle to counteract the trailer sway thereby mitigating/resolving such occurrences before they evolve into uncontrollable events. Accordingly, the trailer stability system employs sensors (e.g., pressure sensors, cameras, etc.) that may be configured in various arrangements about the vehicle and the trailer but generally serve to provide information the trailer stability system uses to identify the onset of trailer sway. That is, for example, the trailer stability system characterizes a pressure differential experienced by the vehicle and the trailer by monitoring the sensor data for aspects that are indicative of trailer sway.

In one embodiment, the trailer stability system monitors pressure differentials between pressure sensors on opposing sides of the vehicle and the trailer. When the trailer stability system detects a pressure differential, which is indicative of lateral forces, that is likely to induce trailer sway, the system can generate controls for the vehicle/trailer in response thereto that counteract the sway. Moreover, in further aspects, the trailer stability system predicts the onset of potential trailer sway by identifying approaching vehicles and other environmental characteristics that are associated with pressure differentials on the trailer that can cause trailer sway. For example, the trailer stability system, in one approach, analyzes images from cameras on the vehicle/trailer in order to identify approaching vehicles and predict whether the approaching vehicle will induce trailer sway caused by an associated pressure front.

In either case, from the determinations of the pressure differentials, the trailer stability system, in one approach, automatically generates controls (e.g., braking, accelerating, steering, etc.) that mitigate induced instability. For example, the trailer stability system can activate brakes of the trailer, cause the vehicle to accelerate, cause the vehicle to steer in a particular manner, and so on. The trailer stability system formulates the individual controls or combinations of controls to control the trailer sway and maintain the vehicle and the trailer under control and, for example, according to particular aspects of the circumstances (e.g., speed, magnitude of forces, etc.). In this way, the trailer stability system improves control of the vehicle-trailer combination by using information about the vehicle-trailer and/or the surrounding environment to detect the instability and to automatically control the vehicle and/or trailer thereby preventing the development of sway.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, can tow a trailer, and thus benefits from the functionality discussed herein. Furthermore, while not explicitly illustrated, the vehicle 100 includes additional components that facilitate connection of a trailer and control of the trailer by the vehicle 100. In one embodiment, the vehicle 100 includes a physical connection point (e.g., ball and hitch) to which a trailer may be attached for towing. In further aspects, the vehicle 100 also includes a data/electrical connection port through which the vehicle 100 links to trailer systems such as signaling systems, braking systems, sensor systems, and so on of the trailer. Accordingly, in various approaches, the vehicle 100 can control the noted systems of the trailer via the connection and/or acquire information from the systems.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. However, it should be understood that the embodiments described herein may be practiced using various combinations of these elements.

In either case, the vehicle 100 includes a trailer stability system 170 that functions to improve the stability of a trailer during occurrences of sway resulting from pressure differentials on the trailer. Moreover, while depicted as a stand-alone component, in one or more embodiments, the trailer stability system 170 is integrated with the autonomous driving module 160, or another component of the vehicle 100. The noted functions and methods will become more apparent with a further discussion of the figures.

Figure 2:
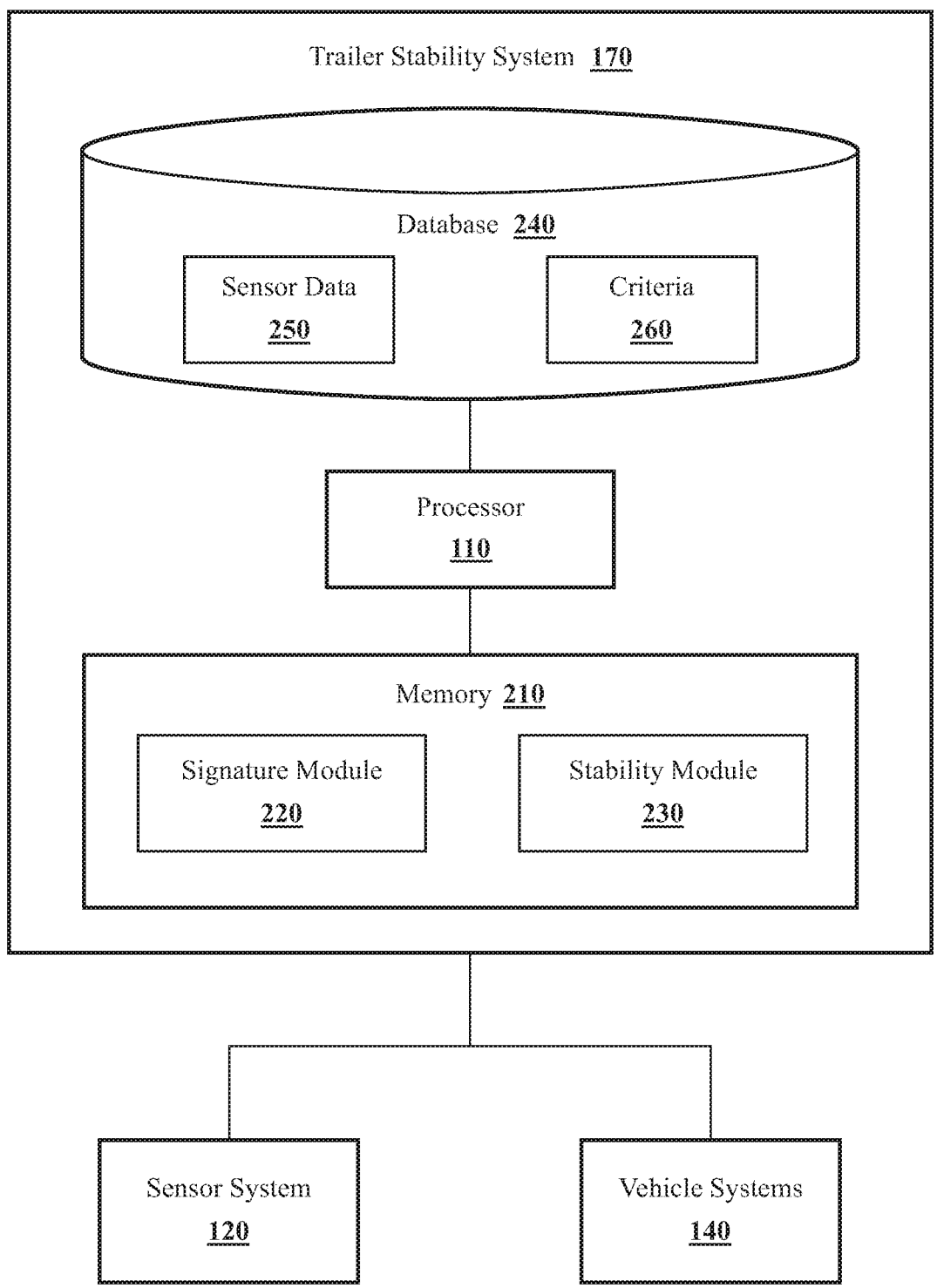
FIG. 2 illustrates one embodiment of a trailer stability system that is associated with mitigating instability in a trailer induced by a pressure differential.

With reference to FIG. 2, one embodiment of the trailer stability system 170 is further illustrated. As shown, the trailer stability system 170 includes a processor 110. Accordingly, the processor 110 may be a part of the trailer stability system 170 or the trailer stability system 170 may access the processor 110 through a data bus or another communication path. In one or more embodiments, the processor 110 is an application specific integrated circuit that is configured to implement functions associated with a signature module 220 and a stability module 230. In general, the processor 110 is an electronic processor such as a microprocessor that is capable of performing various functions as described herein. In one embodiment, the trailer stability system 170 includes a memory 210 that stores the signature module 220 and the stability module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein.

Furthermore, in one embodiment, the trailer stability system 170 includes a database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes sensor data 250, and criteria 260 along with, for example, other information that is used by the modules 220 and 230.

Accordingly, the signature module 220 generally includes instructions that function to control the processor 110 to receive data inputs from one or more sensors of the vehicle 100 that form the sensor data 250. In general, the sensor data 250 includes pressure measurements from pressure sensors on the vehicle 100. In further aspects, the sensor data 250 also includes pressure measurements from pressure sensors mounted/integrated with the trailer. Thus, the signature module 220, in one embodiment, acquires the pressure measurements via a communication link with the sensors on the trailer that is formed via the data connection link between the vehicle 100 and the trailer. In either case, the pressure sensors themselves are generally integrated with and/or mounted on the vehicle 100 at, for example, the four corners of the vehicle 100. Similarly, the trailer may include sensors at the four corners. In further approaches, the vehicle 100 and/or the trailer may include fewer or more pressure sensors depending on the characteristics of a particular implementation.

In either case, the pressure sensors are generally implemented in pairs with each pressure sensor having a corresponding sensor in the pair on an opposite side of the vehicle 100 and/or the trailer. Accordingly, the pairs of pressure sensors provide for measuring pressure differentials between opposing sides of the trailer/vehicle. The pressure differentials function to characterize imbalances of pressure on the vehicle/trailer and thus lateral forces pushing against the trailer/vehicle 100 that may induce instability. As will be discussed in greater detail subsequently, the trailer stability system 170 characterizes the pressure differentials computed from the pairs of pressure sensors along with, in one embodiment, additional sensor information into pressure signatures. The system 170 can then use the pressure signatures to determine whether the onset of instability (e.g., sway) in the trailer is likely to occur or is occurring.

In further embodiments, as mentioned, the trailer stability system 170 acquires additional information as part of the sensor data 250. For example, the signature module 220, in one embodiment, controls additional sensors of the vehicle 100 other than the pressure sensors to acquire, as part of the sensor data 250, information that embodies observations of the surrounding environment of the vehicle 100. Thus, the observations embodied in the sensor data 250 can include, for example, surrounding lanes and vehicles/obstacles that may be present in the lanes. The trailer stability system 170 may be implemented to use multiple sensors of the vehicle 100 including, for example, camera 126 to acquire the sensor data 250. It should be appreciated that the disclosed approach can be extended to cover further configurations of sensors such as multiple cameras (e.g., forward and rear-facing), LiDAR sensors in combination with one or more cameras, different types of LiDARs and cameras, combinations of radars and cameras, sonar, use of a single sensor (e.g., camera), sensors of the surrounding vehicles leveraged via vehicle-to-vehicle communications (v2v), integrated sensors within the vehicle (e.g., IMU), and so on.

Moreover, as a general matter, the signature module 220, in one approach, acquires the sensor data 250 and processes (i.e., image recognition) the sensor data 250 to generate observations of the surrounding environment. In alternative arrangements, the signature module 220 functions cooperatively with other modules/systems in the vehicle 100. For example, the signature module 220, in one approach, functions together with the autonomous module 160 to implement various routines for performing object detection and recognition, localization, lane marker/boundary identification, and so on. Thus, the autonomous module 160 and the signature module 220, in one embodiment, use the sensor data 250 to identify approaching vehicles, characteristics of the approaching vehicles (e.g., size, speed, etc.), environmental characteristics (e.g., tunnels, unprotected segments of roadway subject to crosswinds, etc.), operational characteristics of the vehicle 100 and the trailer (e.g., information acquired from an IMU), and other information that informs the system 170 about the stability of the trailer and the presence of pressure differentials on the trailer.

In either case, the signature module 220, in one embodiment, controls the respective sensors to provide the data inputs in the form of the sensor data 250. Additionally, while the signature module 220 is discussed as controlling the various sensors of the sensor system 120 to provide the sensor data 250, in one or more embodiments, the signature module 220 employs other techniques that are either active or passive to acquire the sensor data 250. For example, the signature module 220 may passively sniff the sensor data 250 from a stream of electronic information provided by the various sensors to further components within the vehicle 100. Moreover, the signature module 220 can undertake various approaches to fuse data from multiple sensors when providing the sensor data 250 and/or from sensor data acquired over a wireless communication link (e.g., v2v, WiFi, etc.) from one or more surrounding vehicles and/or wirelessly enabled sensors. Thus, the sensor data 250, in one embodiment, represents a combination of measurements acquired from multiple sensors.

The sensor data 250 itself generally provides information to identify surrounding vehicles, identify lane markings, characteristics of objects in the environment, pressure measurements, and so on. Moreover, the signature module 220, in one embodiment, controls the sensors to acquire the sensor data 250 about an area that encompasses 360 degrees about the vehicle 100 in order to provide a comprehensive assessment of the surrounding environment. Of course, in alternative embodiments, the signature module 220 may acquire the sensor data 250 about a forward direction alone when, for example, the vehicle 100 is not equipped with further sensors to include additional regions about the vehicle and/or the trailer stability system 170 is, for example, not concerned about potential instability arising from outside of a forward direction of the vehicle 100.

Moreover, with further reference to FIG. 2, in one embodiment, the signature module 220 generally includes instructions that function to control the processor 110 to execute various actions in support of the trailer stability system 170. For example, in one embodiment, the signature module 220 receives the sensor data 250 and uses the sensor data 250 to generate a pressure signature. The pressure signature, in one embodiment, characterizes lateral forces on the vehicle 100 and/or the trailer resulting from pressure differentials, which may originate according to different sources.

It should be appreciated that the trailer stability system 170 can be implemented in different forms to produce the pressure signature. That is, in a simple form, the signature module 220 considers, for example, pressure measurements from the pressure sensors alone. Accordingly, the signature module 220, in one approach, acquires pressure measurements from the pressure sensors. The signature module 220 may sample the pressure measurements at regular intervals and, for example, normalize the pressure measurements according to identified steady states for the respective sensors. In other words, because the pressure sensors may experience different levels of steady pressure (e.g., low-level environmental pressure) and various perturbations, the signature module 220, in one approach, identifies the noted aspects as background noise and removes the background noise from the pressure measurements to establish a measurement baseline.

It should be appreciated, that the background noise can vary according to speed, traffic and so on; thus, the signature module 220 dynamically processes the pressure measurements to account for the noted variations. In further aspects, the signature module 220 uses profiles of background noise according to different locations (e.g., city vs. rural highway) and/or conditions (e.g., traffic, weather, etc.). In any case, the signature module 220 analyzes the adjusted pressure measurements to generate the pressure signature. As such, in one embodiment, the signature module 220 generates the pressure signature as pressure differential derived from comparing the pressure measurements between a pair of pressure sensors on opposing sides of the vehicle 100. In practice, the signature module 220 uses pressure measurements from sensors at corresponding locations on opposite sides of the vehicle/trailer. Thus, the signature module 220, in one approach, generates the pressure signature as a direct corollary to a resulting pressure differential quantified from the comparison.

The pressure differential characterizes differences/changes in the pressure between the pair of pressure sensors. Thus, the signature module 220 generates the pressure differential to indicate a magnitude of the difference in pressure measurements over a period of time. While the signature module 220 may generate the pressure differential for a single pair of pressure sensors in order to generate the pressure signature, in embodiments where the vehicle 100 and/or the trailer include multiple sets of pressure sensors, the signature module 220 determines the pressure differentials for the separate sets. For example, for each pair of pressure sensors, the signature module 220 separately generates a pressure differential. The signature module 220 may combine the separate pressure differentials into an overall differential or score embodied by the pressure signature in order to assess current or expected lateral forces on the trailer.

In one embodiment, pressure differentials from multiple pairs of sensors can be valued/weighted differently according to locations of the respective pairs on the vehicle/trailer. For example, a differential derived from a pair of sensors at a forward location on the vehicle 100 (e.g., near front headlights on sides of the vehicle 100) may be weighted less because of a distance from the trailer and a time associated with the pressure differential propagating to the trailer. By contrast, a pair of pressure sensors on a rear section of the trailer may garner more weight since the rear section of the trailer is more sensitive to lateral forces inducing sway. Thus, the signature module 220 can generate the pressure signature according to multiple pressure differentials on the vehicle/trailer. In this way, the pressure signature can characterize a current state of lateral forces overall for the trailer/vehicle combination in order to assess the onset of sway.

Moreover, the signature module 220, in further embodiments, also uses information from other sensors as part of analyzing the sensor data 250 to generate the pressure signature. In one approach, the signature module 220 generates the pressure signature to include the pressure differential(s) or a characterization thereof and also uses information from recognized objects in the surrounding environment of the vehicle 100. For example, the signature module 220, in one embodiment, performs image recognition on image data (video or still images) to identify aspects of the surrounding environment that further inform whether the onset of sway is likely.

Thus, in one approach, the signature module 220 identifies approaching vehicles (whether from ahead or behind) from the sensor data 250. The signature module 220 uses, in one aspect, the information about the presence of approaching vehicles to confirm a detected pressure differential. That is, if the signature module 220 identifies a pressure differential having characteristics (e.g., magnitude and period) that may induce sway in the trailer, then the signature module 220 undertakes further analysis of the pressure differential by analyzing the sensor data 250 to identify additional defining characteristics. Thus, the signature module 220, in one embodiment, analyzes images from the camera 126 to correlate the pressure differential with a particular vehicle and/or feature in the surrounding environment. The signature module 220 can identify the approaching vehicle and a type (e.g., size/class such as passenger car vs. semi-truck) of the approaching vehicle, a relative direction of travel, a proximity of the approaching vehicle, and so on. Moreover, while discussed as being a further analysis, the signature module 220 generally undertakes the analysis simultaneously with the assessment of pressure differentials and in, for example, an ongoing manner (e.g., at least semi-continuously). Using this information, the signature module 220 can verify the pressure differential detected from the pressure sensors and further refine the detection to indicate, for example, a direction of travel of an associated pressure front, a magnitude, whether the pressure differential is likely to dissipate or continue to the rear section of the trailer, and so on.

In further aspects, the signature module 220 analyzes the sensor data 250 to identify the approaching vehicle(s) and predict an oncoming pressure differential. That is, before a pressure front actually impacts the vehicle 100 and/or the trailer to cause a measurable pressure differential between sensors, the signature module 220 predicts the oncoming pressure differential according to aspects of the surrounding environment as the signature module 220 identifies from the sensor data. Thus, the signature module 220 identifies the approaching vehicles, embankments, tunnels, and other features that generally have particular pressure signatures associated therewith. As such, from the identification of the noted features/vehicles, the signature module 220 predicts the oncoming pressure differential and characteristics thereof (e.g., magnitude).

In various approaches, as will be discussed in greater detail subsequently, the stability module 230 performs various actions in response to an oncoming pressure differential having particular attributes that satisfy criteria 260 defined by the trailer stability system 170. For example, the stability module 230 can pre-emptively adjust one or more of the vehicle systems 140 to facilitate mitigating effects of the pressure differential once encountered. Thus, the stability module 230 can prime brake lines, adjust a gear of the transmission, slow the vehicle 100, pre-emptively accelerate, and so on. In further aspects, the stability module 230 sensitizes the pressure sensors to focus a detection during a particular time window, and so on. Moreover, such pre-emptive actions by the stability module 230 can be combined, in one embodiment, with actual subsequent detection of a current pressure differential by the signature module 220 that also satisfy the criteria 260. As such, the system 170 can use pre-emptive detections of pressure differentials as predicted via image recognition in combination with detections of the actual onset of the pressure differential to improve overall detection and mitigation of instability.

Whichever approach is undertaken within the trailer stability system 170, the system 170 uses the sensor data 250 to characterize the presence of lateral forces on the vehicle 100 and the trailer resulting from pressure differentials acting on the vehicle 100 and the trailer.

Moreover, with further reference to FIG. 2, in one embodiment, the stability module 230 generally includes instructions that function to control the processor 110 to execute various actions. For example, in one embodiment, the stability module 230 uses the pressure signature from the signature module 220 to determine whether the onset of instability in the trailer is occurring or is likely to occur so that the stability module 230 can counteract the instability.

In one embodiment, the stability module 230 determines the onset of instability according to a pressure differential by using the criteria 260 that define thresholds/conditions associated with the onset. As with other aspects of the trailer stability system 170, the criteria 260 can be implemented with varying degrees of specificity and characteristics depending on a particular implementation. For example, in one approach, the trailer stability system 170 defines the criteria 260 as a pressure threshold associated with the pressure differentials and indicating a magnitude of the pressure differential to trigger a response by the stability module 230. It should be appreciated that while the pressure threshold is discussed as a binary trigger, a response of the system 170 can include varying tiers (i.e., degrees/combinations) of controls according to the pressure differentials once the initial pressure threshold is satisfied.

In further aspects, the system 170 defines the criteria 260 according to operational characteristics of the vehicle 100 and/or the trailer. For example, criteria 260 can be implemented to be specific to a current speed of the vehicle 100, a type/size/weight of the vehicle 100, a type/size/weight/length of the trailer, road conditions, and/or other operational aspects of the trailer/vehicle combination that influence a response to lateral forces.

Thus, as an additional note, the system 170 can preconfigure the criteria 260 according to characteristics of the vehicle 100 and the trailer. As such, the trailer stability system 170, in one embodiment, provides a user interface or other electronic means for receiving electronic inputs that define the trailer length, trailer height, weight, number of axles, wheelbase, sensor configuration, and so on. Similarly, the trailer stability system 170 includes in memory or can receive information (through the same or a similar UI) about the vehicle 100 such as weight, length, wheelbase, and so on. Using this information, the trailer stability system 170 defines the criteria 260 according to a sensitivity of the attributes of the vehicle-trailer combination to lateral forces from pressure differentials. Thus, depending on, for example, trailer length and height, the system 170 can sensitize the criteria 260 in order to ensure proper detection of the onset of sway.

By way of example, the criteria 260 may specify a lower magnitude for pressure thresholds according to higher speeds and/or according to longer/taller trailers. It should be appreciated that the criteria 260 can vary widely according to particular characteristics of the vehicle-trailer combination and particular aspects of the operating conditions. Thus, the present examples are provided without limitation.

In either case, the stability module 230, in one or more embodiments, functions to control the vehicle 100 according to the pressure signature to avoid or at least mitigate trailer instability/sway. As such, the stability module 230 upon determining that the pressure signature satisfies the criteria 260, generates one or more control signals for controlling the vehicle 100 and/or the trailer. The stability module 230 generates the control signals according to attributes of the pressure signature and/or operating conditions of the vehicle 100.

For example, in one approach, the stability module 230 generates the control signals to control steering of the vehicle 100, braking of the vehicle 100, acceleration of the vehicle 100, and/or braking of the trailer. The stability module 230 may generate the control signals to control the various aspects in different combinations, degrees, patterns, and so on, and depending on particular operating conditions. By way of example, the stability module 230 may brake the trailer to mitigate/alleviate sway that is developing in the trajectory of the trailer. In further embodiments, the stability module 230 accelerates the vehicle 100 to compensate for the sway. Thus, depending on particular conditions (e.g., amount of sway/lateral forces, trailer size, weather conditions, traffic, etc.), the stability module 230 can vary the response to the sway in combinations of controls and the degree (e.g., amount of braking/acceleration) that is employed to counteract the sway. In this way, the trailer stability system 170 improves the stability of the towed trailer by determining when such conditions are occurring or beginning to occur from which mitigating actions can be undertaken by the vehicle 100.

Figure 3:
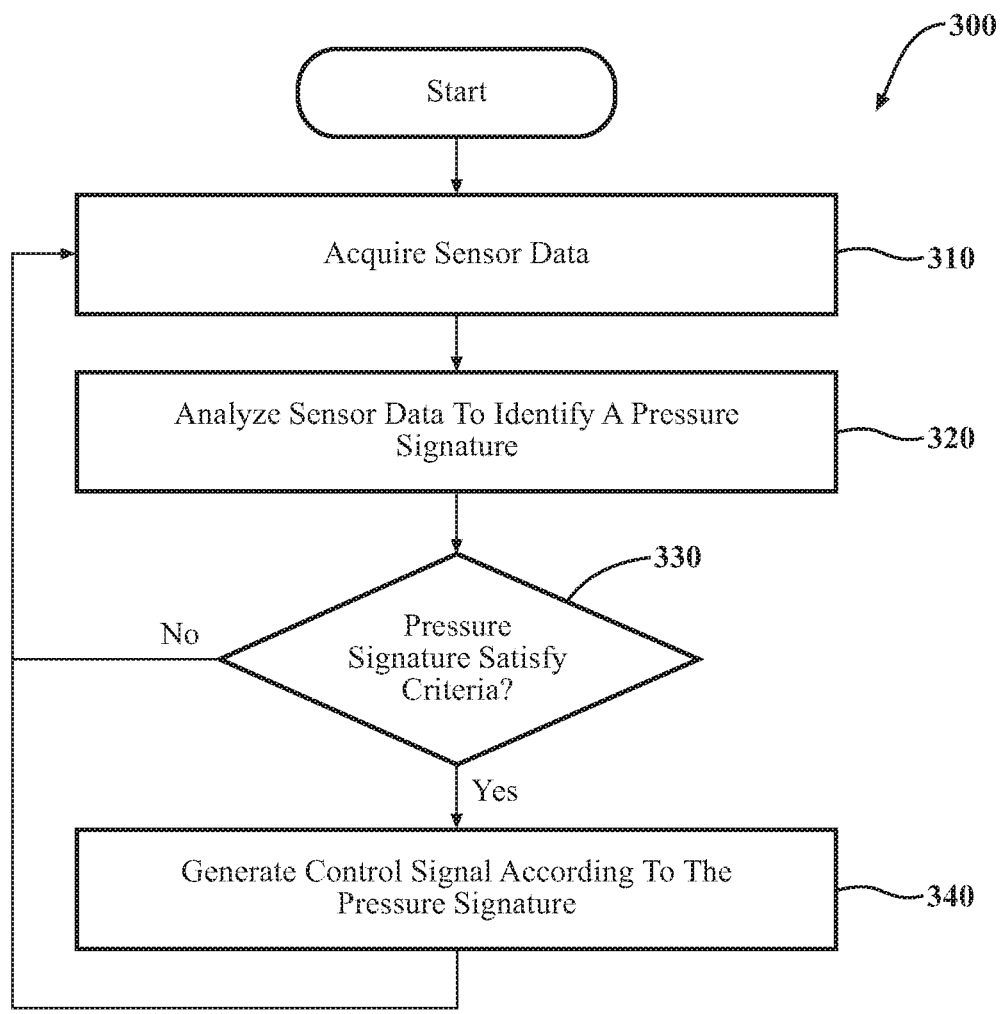
FIG. 3 is a flowchart illustrating one embodiment of a method associated with improving the stability of a trailer being towed by a vehicle.

Additional aspects of improving sway stability of a trailer being towed by a vehicle will be discussed in relation to FIG. 3. FIG. 3 illustrates a flowchart of a method 300 that is associated with detecting pressure differentials on a vehicle/trailer and automatically controlling a vehicle to mitigate the onset of sway. Method 300 will be discussed from the perspective of the trailer stability system 170 of FIGS. 1-2. While method 300 is discussed in combination with the trailer stability system 170, it should be appreciated that the method 300 is not limited to being implemented within the trailer stability system 170 but is instead one example of a system that may implement the method 300.

At 310, the signature module 220 acquires the sensor data 250 from the set of sensors. As previously mentioned, the set of sensors include at least two pressure sensors that are located on opposite sides of the trailer and/or the vehicle 100. In one embodiment, the signature module 220 acquires the measurements from sensors of the vehicle 100 in order to derive a pressure differential that is associated with lateral forces being exerted on the trailer and/or the vehicle 100. Moreover, in additional/alternative embodiments, the signature module 220 further acquires information from cameras and/or other sensors of the vehicle 100 and/or the trailer to supplement the sensor data 250. In this way, the system 170 can use the additional information to further refine determinations about the presence of pressure differentials that may induce instability.

At 320, the signature module 220 analyzes the sensor data 250 to generate a pressure signature. As previously indicated, the pressure signature, in one embodiment, characterizes lateral forces on the trailer and/or vehicle 100 resulting from a pressure differential between opposite sides. Thus, as one approach, the signature module 220 analyzes the sensor data 250 by comparing pressure measurements from at least two opposing pressure sensors. As previously outlined, the signature module 220 can undertake a more complex analysis when additional pairs of sensors are present from which multiple pressure differentials can be derived.

Thus, the signature module 220, in one embodiment, generates pressure differentials for each pair of sensors and processes the multiple differentials according to a heuristic or other approach to generate the pressure signature. By way of example and without limitation, the signature module 220 can generate the pressure signature as an overall score by weighting the different differentials according to locations of sensors and/or other factors. In still further approaches, the signature module 220 can select one of the differentials as being representative of a current condition according to characteristics of the differential itself, an associated pair of sensors providing the detection, and/or other detected circumstances (e.g., identification of a vehicle and a location thereof).

Moreover, the signature module 220, in one or more embodiments, further analyzes image data using one or more image recognition techniques (e.g., convolutional neural networks (CNN)) to identify the presence of vehicles and/or environmental conditions that correspond with a pressure differential. As such, the signature module 220, for example, generates the pressure signature with further indications (whether combined into a score or indicated explicitly) about identified aspects of the surrounding environment from the images that can influence pressure differentials imparted onto the vehicle 100 and/or the trailer. For example, as previously discussed, the signature module 220 can use information about the identified approaching vehicles from the images to confirm the presence of a pressure differential and, for example, a direction of propagation of the differential in order to further refine the detection.

At 330, the stability module 230 determines whether the pressure signature satisfies the criteria 260 indicating an onset of instability in the trailer. In one embodiment, the stability module 230 initially computes the criteria 260 as a function of at least known characteristics of a pressure differential (e.g., a period and a magnitude) that are likely to induce instability in the trailer. That is, the stability module 230 initially defines the criteria 260 according to characteristics associated with the vehicle 100 and the trailer. The stability module 230 can also define the criteria 260 that are to be presently applied according to operational aspects of the vehicle 100 such as speed, weather conditions, and so on. In this way, the stability module 230 dynamically adjusts the criteria 260 to account for changing conditions.

Moreover, the stability module 230 compares attributes of the pressure differential (e.g., period/duration, magnitude, etc.) identified in the pressure signature to the criteria 260. As previously explained, the stability module 230 can perform the comparison to identify whether the pressure signature satisfies basic characteristics (e.g., magnitude) or can perform more complex analysis involving identification of whether the pressure signature confirms the presence of an approaching vehicle in combination with a threshold pressure value for the magnitude of the differential as specified in the criteria 260. In either case, the stability module 230 compares the pressure signature embodying the presence of any pressure differential against the criteria 260 to identify whether a pressure differential that may affect the stability of the trailer is present.

At 340, the stability module 230 generates a control signal based, at least in part, on the pressure signature to activate one or more vehicle systems to mitigate the instability in the trailer. The stability module 230 upon determining that a pressure differential, which may or is influencing the stability of the trailer, is present generates the control signal(s) to mitigate the differential. In one embodiment, the module 230 generates the control signal(s) to activate systems of the trailer and/or the vehicle 100. Thus, the stability module 230 can generate and transmit signals to the trailer via the connection point in order to cause the trailer to, for example, brake. In one aspect, the stability module 230 generates the control signal(s) to activate one or more brakes of the vehicle 100, to steer the vehicle 100, to accelerate the vehicle, and so on. The stability module 230, in one approach, generates multiple control signals in order to activate a combination of the noted systems/functions. In this way, the stability module 230 actively and automatically controls the vehicle 100 and/or the trailer to counteract the instability and thereby mitigate effects of trailer sway. Thus, the trailer stability system 170, in one approach, acts as a supervising system to monitor operation of the vehicle 100 and intervene in manual operation of the vehicle 100 to prevent instability in the trailer from pressure differentials.

Figure 4:
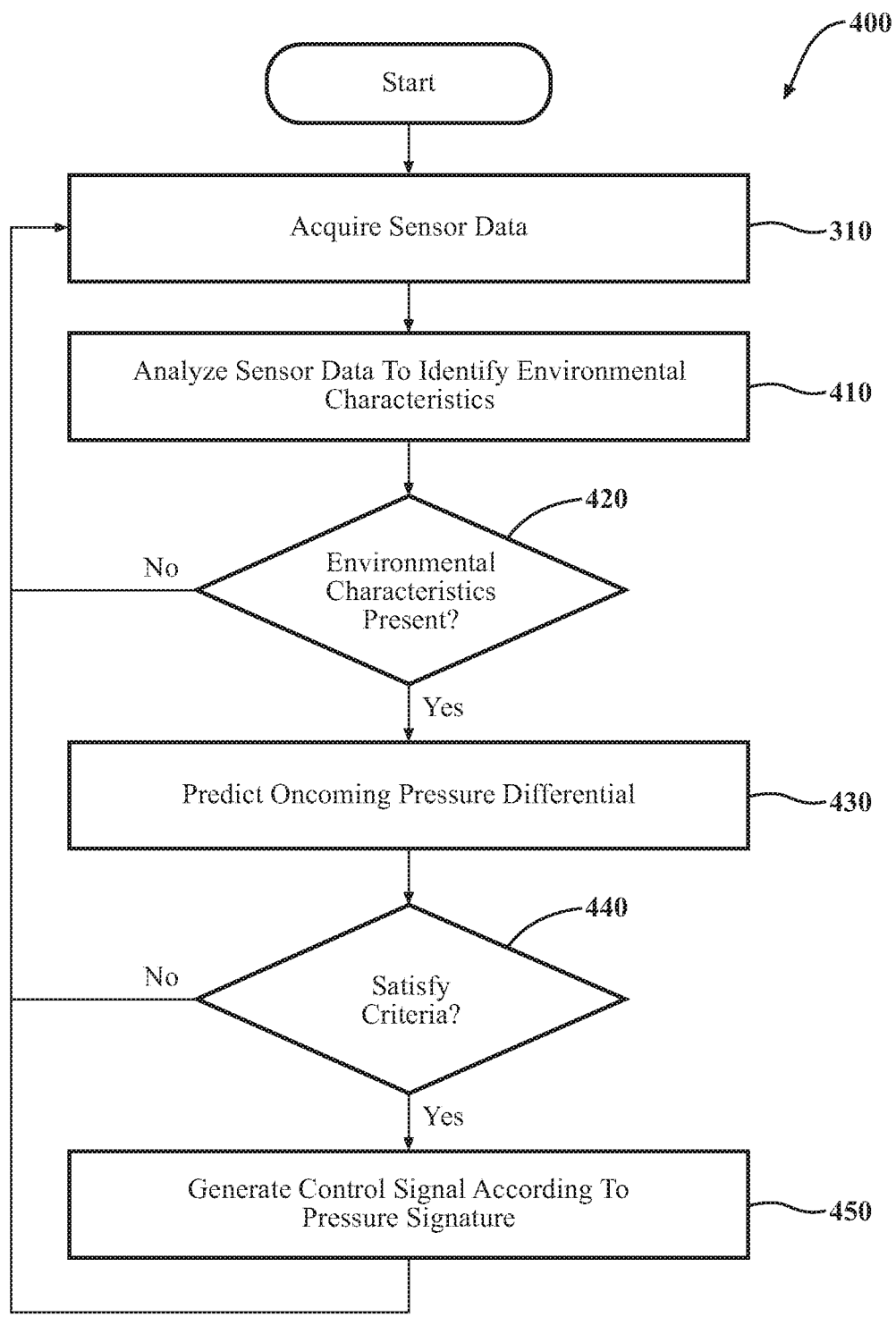
FIG. 4 is a flowchart illustrating one embodiment of a method associated with predicting pressure differentials on a trailer and mitigating effects therefrom.

FIG. 4 illustrates an additional flowchart of a method 400 that is associated with preventing the onset of sway in a trailer through the use of image recognition. The method 400 will also be discussed from the perspective of the trailer stability system 170 of FIGS. 1-2. While method 400 is discussed in combination with the trailer stability system 170, it should be appreciated that the method 400 is also not limited to being implemented within the trailer stability system 170 but is instead one example of a system that may implement the method 400.

At 310, the signature module 220 acquires the sensor data 250. In a similar fashion as discussed in relation to FIG. 3, the signature module 220 acquires the sensor data 250 in order to characterize current circumstances surrounding the vehicle 100. As a further aspect, the signature module 220 also acquires image data of the surrounding environment in order to assess aspects of the surrounding environment in relation to the vehicle 100 and the trailer. The signature module 220 may acquire the images as stereo images, infrared images, still images, video images, or another form. Whichever form the signature module 220 acquires from available image sensors (e.g., camera 126), it should be appreciated that the images provide at least a field-of-view (FOV) encompassing a forward direction of the vehicle 100. In further aspects, the images may further include rear and side views from the vehicle 100 and the trailer. Thus, the signature module 220 may separately process the images or may fuse the images together in a single representation.

At 410, the signature module 220 analyzes the sensor data 250 in order to identify environmental characteristics. In one embodiment, the environmental characteristics include the presence of approaching vehicles, attributes of the approaching vehicles (e.g., size, type, lateral lane offset, distance, etc.), the presence of static structures (e.g., roadside barriers, tunnels, buildings, etc.), weather conditions, and so on. As a general matter, the signature module 220 analyzes the images from the sensor data 250 in order to characterize aspects of the environment that can result in pressure differentials on the trailer and/or aspects that influence the magnitude of such pressure differentials. The signature module 220 can analyze the sensor data 250 to identify the noted aspects and, for example, characterize the noted environmental aspects in the pressure signature and/or as a separate indication. In either case, the system 170 further uses the characterizations of the environmental characteristics to assess instability on the trailer and the potential for subsequent instability.

At 420, the signature module 220 determines whether aspects that are known to influence the stability of the trailer are present in the identified environmental characteristics. In one embodiment, the signature module 220 specifically identifies approaching vehicles whether from ahead or behind as aspects of interest that may influence stability. In further aspects, the signature module 220 further refines the identification of approaching vehicles to, for example, vehicles that are likely to produce a pressure differential on the trailer having at least a defined magnitude. According, the signature module 220 may assess a lateral offset of the approaching vehicles, a size/type, a speed, and other relevant factors in order to determine whether to proceed to block 430.

At 430, if the signature module 220 determines that the environmental characteristics are present from block 420, then the signature module 220 predicts an oncoming pressure differential. The oncoming pressure differential defines predicted differences in the pressure measurements that are likely to occur at a subsequent time step (point in the future) resulting from the identified environmental characteristics of interest. The signature module 220, in one approach, predicts the oncoming pressure differential according to identified characteristics of the approaching vehicle or other condition along with, for example, characteristics of the trailer/vehicle. Thus, the signature module 220 may employ a heuristic along with lookup tables defining relevant variables in order to predict the oncoming pressure differential.

Moreover, the signature module 220, in one embodiment, combines the oncoming pressure differential along with a current pressure differential and other relevant information into the pressure signature.

At 440, the stability module 230 determines whether the pressure signature satisfies the criteria 260. As discussed in relation to block 330 of FIG. 3, the stability module 230 can dynamically generate the criteria 260 and compare the pressure signature with the criteria 260 to determine whether mitigating controls are needed. Thus, the criteria 260 can specify a combination of aspects and, for example, associated actions/controls to undertake in association with satisfying the aspects. Thus, the trailer stability system 170, in one embodiment, is executing the method 300 and the method 400 in parallel in order to provide a comprehensive approach to mitigating instability in the trailer. Thus, at 440, the stability module 230, in one approach, determines whether the predicted difference satisfies the criteria 260. The criteria 260 may indicate a magnitude and/or period of the predicted difference. In further aspects, the criteria 260 may specify a minimum confidence interval associated with the prediction of the predicted difference in order to satisfy the determination.

Of course, in addition to comparing the predicted difference, the stability module 230 can simultaneously compare the actual present pressure differential as part of determining whether the criteria 260 are satisfied.

At 450, the stability module 230 generates control signals to cause the vehicle 100 and/or the trailer to counteract the instability as identified from the pressure signature satisfying at least a portion of the criteria 260. That is, where the predicted difference satisfies the criteria 260, the stability module 230 generates control signals to counteract the predicted differences. However, because the pressure differential is predicted and has not yet affected the trailer and/or the vehicle 100, the particular nature of the controls may have a different character than those discussed at 340. For example, the stability module 230, in one embodiment, adjusts a sensitivity of pressure sensors to improve detection of the predicted differential. In further aspects, the stability module 230 pre-emptively adjusts one or more of the vehicle systems 140 in anticipation of the predicted differential. For example, the stability module 230 generates control signals to prime brake lines, adjust current gear of the transmission, and so on. Alternatively, or additionally, the stability module 230 may pre-emptively brake the vehicle 100 to reduce a speed, pre-emptively steer the vehicle 100 into a different lane, and/or perform other functions that mitigate the predicted pressure differential.

Moreover, the stability module 230 generally functions in a similar manner at 450 as discussed in relation to 340. That is, the stability module 230 generates control signals based, at least in part, on the pressure signature that activate one or more systems 140 of the vehicle 100 to mitigate the instability in the trailer. Thus, while performing the noted actions for the predicted differential, the stability module 230 may also generate control signals to mitigate the current pressure differential such as braking, accelerating, and so on. In either case, the trailer stability system 170 generally functions to identify the onset of sway in the trailer and improve stability through automatically performing the noted actions.

Figure 5:
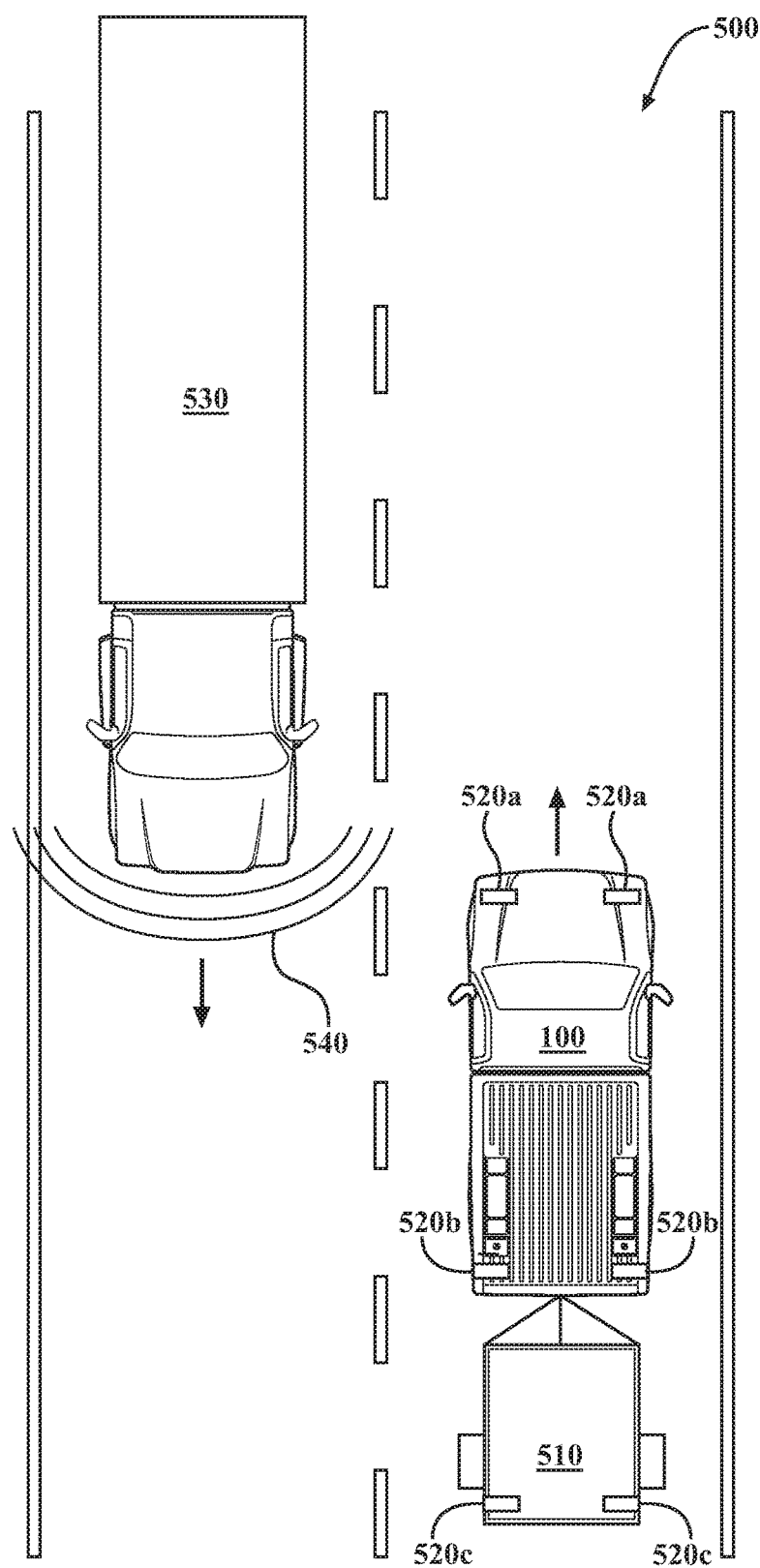
FIG. 5 illustrates one example of a vehicle towing a trailer that encounters pressure differentials generated from other vehicles on a roadway.
Figure 6:
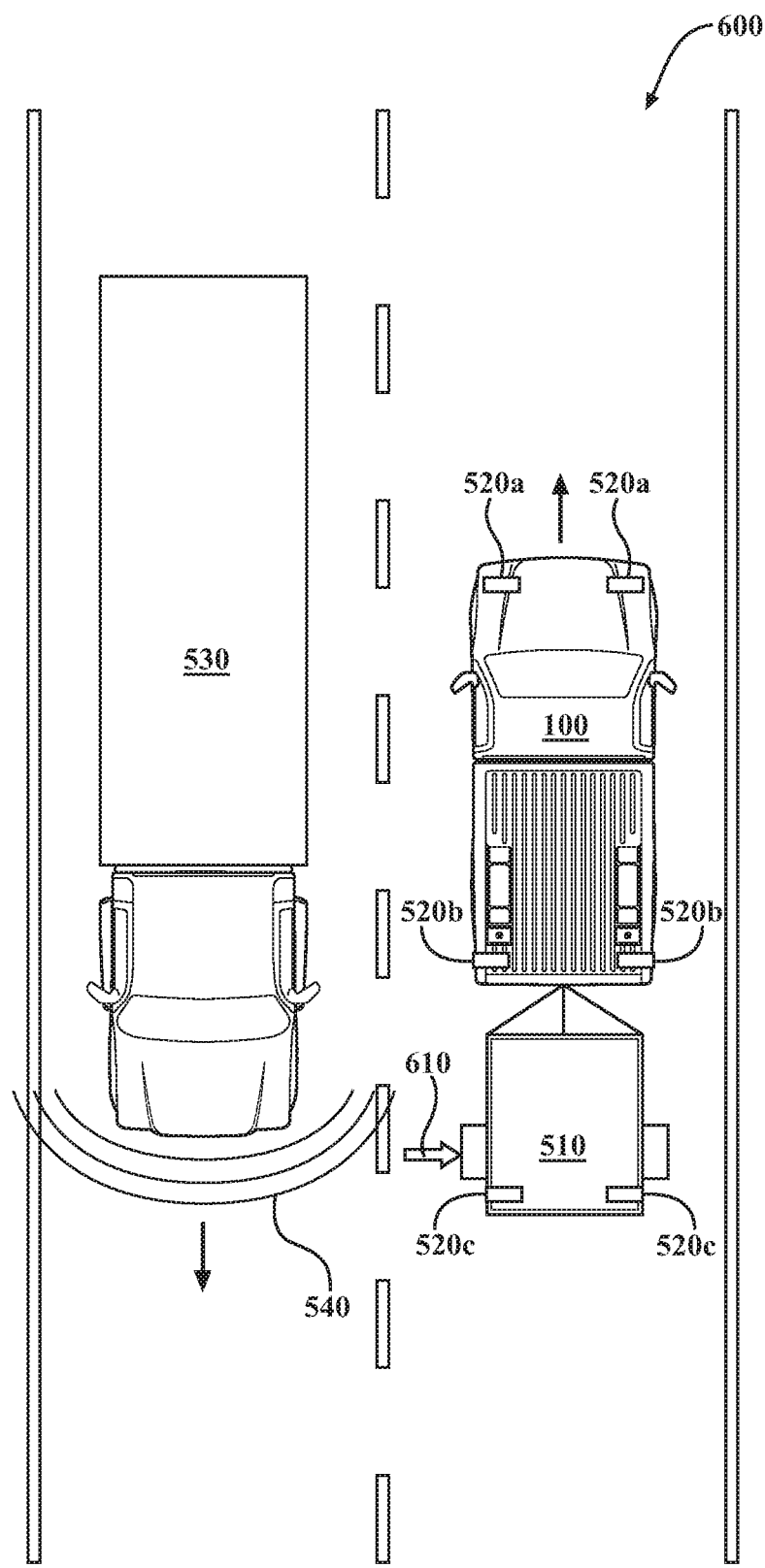
FIG. 6 illustrates lateral forces imparted onto a trailer from a pressure differential.

As a further explanation of how the trailer stability system 170 improves the stability of the trailer, an example of intervention by the system 170 will now be discussed in relation to FIG. 5 and FIG. 6. FIG. 5 illustrates an exemplary two-lane roadway at a first-time step 500. FIG. 5 illustrates the vehicle 100 towing a trailer 510. As shown, the vehicle 100 and the trailer 510 includes three pairs of pressure sensors 520a, 520b, and 520c. The pressure sensors 520c are located on the trailer 510 and are thus connected with the system 170 via a wired data connection between the vehicle 100 and the trailer 510. Moreover, FIG. 5 further illustrates a semi-truck 530 in an adjacent lane and heading in the opposite direction as the vehicle 100. The semi-truck 530 is generating a pressure front 540 as the semi-truck 530 moves along the roadway. It should be appreciated that a magnitude of the pressure front 540 is generally related to a speed, size, aerodynamics and other aspects of the semi-truck 530.

Thus, as discussed in relation to the method 400 of FIG. 4, the trailer stability system 170 may predict an oncoming pressure differential associated with the semi-truck 530 and cause the vehicle 100 and/or the trailer to perform various pre-emptive actions. FIG. 6 illustrates a subsequent time step 600 for the vehicle 100 and the semi-truck 530 for which the pressure front 540 is generating a pressure differential on the trailer 510 as identified via the isolated lateral force 610. Accordingly, the trailer stability system 170 functions to detect the current pressure differential caused by the lateral force 610 and mitigate sway that is developing in the trailer 510 from the forces 610. The system 170 can, for example, brake the trailer 510, accelerate the vehicle 100, steer the vehicle 100, and so on.

Moreover, while illustrated as influencing a rear portion of the trailer 510, the trailer stability system 170, for the illustrated example, would generally identify the pressure front 540 as it propagates along the vehicle 100 and the trailer 510 using sensor data from the sensors 520a, 520b, and 520c. Thus, the trailer stability system 170 may take various mitigating actions as the semi-truck 530 moves from a location illustrated in FIG. 5 to the location illustrated in FIG. 6 including pre-emptive actions and corrective actions that directly mitigate an induced sway.

Figure 7:
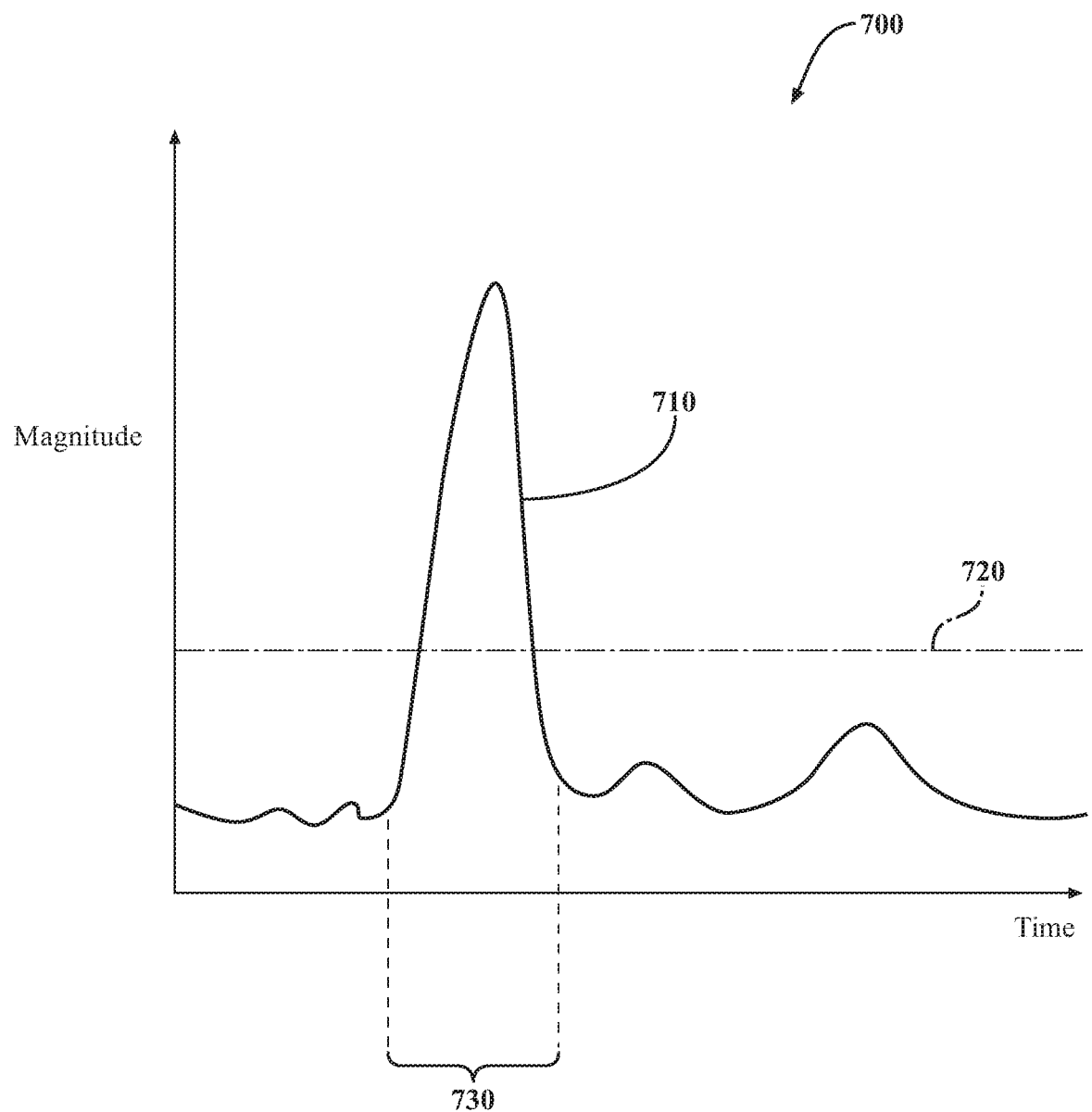
FIG. 7 is a graph illustrating the onset of a pressure differential.

FIG. 7 illustrates one example of a graph 700 that shows an example pressure differential as may be experienced by the trailer. As shown in FIG. 7, the pressure differential signal 710 spikes above a pressure threshold 720 over a period 730. Thus, the illustrated spike is generally indicative of a pressure differential that may be experienced from an approaching vehicle. Moreover, the illustrated pressure differential spike generally occurs over a time scale of one to two seconds with a leading edge providing for identification by the system 170 upon, for example, exceeding the threshold 720. Of course, in further examples, the signal 710 may have different characteristics for different pressure differentials. For example, larger approaching vehicles may induce a larger spike in differential and/or a differential having a longer duration/period. Moreover, the spike may include multiple staggered peaks or another form. In general, the pressure differential is characterized by the system 170 according to at least a magnitude. Of course, the system 170 may also consider a period of the spike and/or other characteristics.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the trailer stability system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the trailer stability system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the trailer stability system 170, and/or the autonomous driving module(s) 160 may control some or all of these vehicle systems 140 and, thus, may be partially or fully autonomous.

The processor(s) 110, the trailer stability system 170, and/or the autonomous driving module(s) 160 can be operatively connected to communicate with the various vehicle systems 140 and/or individual components thereof. For example, returning to FIG. 1, the processor(s) 110, the trailer stability system 170, and/or the autonomous driving module(s) 160 can be in communication to send and/or receive information from the various vehicle systems 140 to control the movement, speed, maneuvering, heading, direction, etc. of the vehicle 100. The processor(s) 110, the trailer stability system 170, and/or the autonomous driving module(s) 160 may control some or all of these vehicle systems 140.

The processor(s) 110, the trailer stability system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the trailer stability system 170, and/or the autonomous driving module(s) 160 can control the direction and/or speed of the vehicle 100. The processor(s) 110, the trailer stability system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the trailer stability system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the stability module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A trailer stability system for improving stability of a trailer being towed by a vehicle, comprising:
   one or more processors; and
   a memory communicably coupled to the one or more processors and storing:
   a signature module including instructions that when executed by the one or more processors cause the one or more processors to analyze sensor data from a set of sensors associated with the vehicle to generate a pressure signature that characterizes lateral forces from differences in air pressure on the trailer resulting from a pressure differential between opposite sides of the trailer; and
   a stability module including instructions that when executed by the one or more processors cause the one or more processors to, in response to determining the pressure signature satisfies criteria indicating an onset of instability in the trailer, generate a control signal based, at least in part, on the pressure signature that activates one or more vehicle systems to mitigate the instability in the trailer.

2. The trailer stability system of claim 1, wherein the signature module includes instructions to acquire the sensor data from the set of sensors including at least two pressure sensors for sensing air pressure external to the trailer that are located on one or more of the opposite sides of the trailer and opposite sides of the vehicle, and
   wherein the signature module includes instructions to analyze the sensor data including instructions to compare pressure measurements from the at least two pressure sensors to quantify the pressure differential.

3. The trailer stability system of claim 1, wherein the stability module includes instructions to determine whether the pressure signature satisfies the criteria including instructions to:
   compute the criteria as a function of at least a period and a magnitude of the pressure differential that are likely to induce the instability according to characteristics associated with the vehicle and the trailer, and
   compare attributes of the pressure differential identified in the pressure signature to the criteria to identify when the pressure signature is indicative of the onset of the instability in the trailer, and
   wherein the stability module includes instructions to generate the control signal including instructions to one or more of i) cause brakes within the trailer to intermittently activate, ii) cause the vehicle to accelerate, and iii) cause the vehicle to steer in a manner that counteracts the instability originating from the pressure differential.

4. The trailer stability system of claim 3, wherein the characteristics include at least a current speed, and a length of the trailer, and
   wherein the stability module includes instructions to determine whether the pressure signature satisfies the criteria including instructions to correlate the pressure differential with environmental characteristics that cause the pressure differential by identifying a presence of the environmental characteristics from the sensor data including at least images of a surrounding environment.

5. The trailer stability system of claim 1, wherein the signature module includes instructions to analyze the sensor data including instructions to acquire at least a portion of the sensor data from one or more sensors in the set of sensors that are from the trailer.

6. The trailer stability system of claim 1, wherein the signature module includes instructions to analyze the sensor data to generate the pressure signature including instructions to determine i) a current pressure differential defining differences in pressure measurements currently occurring on the vehicle and the trailer, and ii) an oncoming differential defining predicted differences in the pressure measurements that are likely to occur at a subsequent time step,
   wherein the signature module includes instructions to determine the oncoming differential including instructions to predict the pressure measurements according to environmental characteristics around the vehicle and the trailer embodied in the sensor data.

7. The trailer stability system of claim 6, wherein the signature module includes instructions to predict the pressure measurements including instructions to i) analyze images of a surrounding environment of the vehicle from the sensor data to identify an approaching vehicle, and ii) predict the oncoming differential according to at least attributes of the approaching vehicle including at least a magnitude of the oncoming differential.

8. The trailer stability system of claim 6, wherein the stability module includes instructions to:
   determine whether the pressure signature satisfies the criteria including instructions to compare the predicted differences with the criteria, and, in response to the predicted differences satisfying the criteria, generate the control signal to pre-emptively adjust the one or more vehicle systems to mitigate the onset of the predicted differences.

9. A non-transitory computer-readable medium for improving stability of a trailer being towed by a vehicle and including instructions that when executed by one or more processors cause the one or more processors to:
   analyze sensor data from a set of sensors associated with the vehicle to generate a pressure signature that characterizes lateral forces from differences in air pressure on the trailer resulting from a pressure differential between opposite sides of the trailer; and
   in response to determining the pressure signature satisfies criteria indicating an onset of instability in the trailer, generate a control signal based, at least in part, on the pressure signature that activates one or more vehicle systems to mitigate the instability in the trailer.

10. The non-transitory computer-readable medium of claim 9, wherein the instructions to acquire the sensor data from the set of sensors include instructions to acquire the sensor data from at least two pressure sensors for sensing air pressure external to the trailer that are located on one or more of the opposite sides of the trailer and opposite sides of the vehicle, and wherein the instructions to analyze the sensor data include instructions to compare pressure measurements from the at least two pressure sensors to quantify the pressure differential.

11. The non-transitory computer-readable medium of claim 9, wherein the instructions to determine whether the pressure signature satisfies the criteria include instructions to:

compute the criteria as a function of at least a period and a magnitude of the pressure differential that are likely to induce the instability according to characteristics associated with the vehicle and the trailer, and compare attributes of the pressure differential identified in the pressure signature to the criteria to identify when the pressure signature is indicative of the onset of the instability in the trailer.

12. The non-transitory computer-readable medium of claim 11, wherein the instructions to generate the control signal include instructions to generate signals to cause one or more of i) activate brakes within the trailer to intermittently, ii) the vehicle to accelerate, and iii) the vehicle to steer in a manner that counteracts the instability originating from the pressure differential.

13. The non-transitory computer-readable medium of claim 11, wherein the characteristics include at least a current speed, and a length of the trailer, and wherein the instructions to determine whether the pressure signature satisfies the criteria include instructions to correlate the pressure differential with environmental characteristics that cause the pressure differential by identifying a presence of the environmental characteristics from the sensor data including at least images of a surrounding environment.

14. A method of improving stability of a trailer being towed by a vehicle, comprising:

analyzing sensor data from a set of sensors associated with the vehicle to generate a pressure signature that characterizes lateral forces from differences in air pressure on the trailer resulting from a pressure differential between opposite sides of the trailer; and in response to determining the pressure signature satisfies criteria indicating an onset of instability in the trailer, generating a control signal based, at least in part, on the pressure signature that activates one or more vehicle systems to mitigate the instability in the trailer.

15. The method of claim 14, further comprising:

acquiring the sensor data from the set of sensors including at least two pressure sensors for sensing air pressure external to the trailer that are located on one or more of the opposite sides of the trailer and opposite sides of the vehicle, wherein analyzing the sensor data includes comparing pressure measurements from the at least two pressure sensors to quantify the pressure differential.

16. The method of claim 14, wherein determining the pressure signature satisfies the criteria includes computing the criteria as a function of at least a period and a magnitude of the pressure differential that are likely to induce the instability according to characteristics associated with the vehicle and the trailer, wherein determining whether the pressure signature satisfies the criteria includes comparing attributes of the pressure differential identified in the pressure signature to the criteria to identify when the pressure signature is indicative of the onset of the instability in the trailer, and wherein generating the control signal includes one or more of i) causing brakes within the trailer to intermittently activate, ii) causing the vehicle to accelerate, and iii) causing the vehicle to steer in a manner that counteracts the instability originating from the pressure differential.

17. The method of claim 16, wherein the characteristics include at least a current speed, and a length of the trailer, and wherein determining whether the pressure signature satisfies the criteria includes correlating the pressure differential with environmental characteristics that cause the pressure differential by identifying a presence of the environmental characteristics from the sensor data including at least images of a surrounding environment.

18. The method of claim 14, wherein analyzing the sensor data to generate the pressure signature includes determining i) a current pressure differential defining differences in pressure measurements currently occurring on the vehicle and the trailer, and ii) an oncoming differential defining predicted differences in the pressure measurements that are likely to occur at a subsequent time step, and wherein determining the oncoming differential includes predicting the pressure measurements according to environmental characteristics around the vehicle and the trailer.

19. The method of claim 18, wherein predicting the pressure measurements includes analyzing images of a surrounding environment of the vehicle from the sensor data to identify an approaching vehicle, and to predict the oncoming differential according to at least attributes of the approaching vehicle including at least a magnitude of the oncoming differential.

20. The method of claim 18, wherein determining whether the pressure signature satisfies the criteria includes comparing the predicted differences with the criteria, and, in response to the predicted differences satisfying the criteria, generating the control signal to pre-emptively adjust the one or more vehicle systems to mitigate the onset of the predicted differences.

* * * * *